US011472486B2

(12) United States Patent
Kuwada et al.

(10) Patent No.: US 11,472,486 B2
(45) Date of Patent: Oct. 18, 2022

(54) REAR VEHICLE-BODY STRUCTURE OF VEHICLE

(71) Applicant: MAZDA MOTOR CORPORATION, Hiroshima (JP)

(72) Inventors: Kyohei Kuwada, Aki-gun (JP); Tsuneki Shimanaka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 127 days.

(21) Appl. No.: 17/114,196

(22) Filed: Dec. 7, 2020

(65) Prior Publication Data
US 2021/0221443 A1 Jul. 22, 2021

(30) Foreign Application Priority Data

Jan. 16, 2020 (JP) .............................. JP2020-005028

(51) Int. Cl.
*B60J 7/00* (2006.01)
*B62D 25/08* (2006.01)
*B62D 25/02* (2006.01)

(52) U.S. Cl.
CPC ........... *B62D 25/08* (2013.01); *B62D 25/025* (2013.01)

(58) Field of Classification Search
CPC ................ Y02E 60/10; H01L 2924/00; H01L 2924/00014; H01L 2924/3011; Y02T 10/70; A61P 43/00; A61P 25/00; E05B 1/0092; E05B 5/003; Y10S 292/31
See application file for complete search history.

(56) References Cited

U.S. PATENT DOCUMENTS

| 3,078,118 | A | * | 2/1963 | Dzienis | B62D 25/087 |
| | | | | | 296/198 |
| 9,738,323 | B2 | * | 8/2017 | Yokoi | B62D 25/04 |
| 9,862,423 | B2 | * | 1/2018 | Yokoi | B62D 25/087 |
| 10,279,846 | B2 | * | 5/2019 | Takahashi | B62D 25/2027 |
| 2018/0273108 | A1 | * | 9/2018 | Masuda | B62D 25/088 |
| 2018/0273109 | A1 | * | 9/2018 | Masuda | B62D 25/02 |
| 2019/0291782 | A1 | * | 9/2019 | Tsukamoto | B62D 25/08 |
| 2021/0221440 | A1 | * | 7/2021 | Kuwada | B62D 21/152 |
| 2021/0221443 | A1 | * | 7/2021 | Kuwada | B62D 21/152 |
| 2021/0276625 | A1 | * | 9/2021 | Shimanaka | B62D 25/2036 |
| 2021/0276626 | A1 | * | 9/2021 | Shimanaka | F01N 13/1822 |

FOREIGN PATENT DOCUMENTS

JP          2019-123456 A      7/2019

* cited by examiner

*Primary Examiner* — Kiran B Patel
(74) *Attorney, Agent, or Firm* — Studebaker & Brackett PC

(57) ABSTRACT

Upper frames and a lower frame that connect a rear end of a coupled body composed of a side sill and a rear pillar and a rear side housing to each other are spaced apart in a vehicle up-down direction. An inclined angle at which a lower frame is inclined to be closer to a vehicle inner side toward a vehicle rear side is larger than inclined angles at which the upper frames are inclined to be closer to the vehicle inner side toward the rear side. A lower joined portion to which a rear end of the lower frame is joined is on a vehicle-width-direction inner side with respect to an upper joined portion in the rear side housing, which is composed of a single member including at least the lower frame rear-end joined portion, and the first and second upper frame rear-end joined portions, and extending therebetween.

20 Claims, 8 Drawing Sheets

REAR VEHICLE-BODY STRUCTURE OF VEHICLE

BACKGROUND

Technical Field

The present disclosure relates to a rear vehicle-body structure of a vehicle including rear side housings that support rear suspensions, side sills that extend in the vehicle front-rear direction on the vehicle front side with respect to the rear side housings, and pillars, which extend in the vehicle up-down direction and of which lower portions are joined to the side sills, for example.

Background Art

In a rear vehicle-body structure of a vehicle such as a sports car, the support rigidity of rear suspensions needs to be increased in order to increase the steering stability of the vehicle. In the rear vehicle-body structure of the vehicle, a rear-end collision load may be input to rear side housings at the time of a collision with a collision object from the vehicle rear side (hereinafter abbreviated to a "rear-end collision"). Therefore, the rear-end collision load input to the rear side housings needs to be effectively transmitted to the vehicle front side.

Regarding the problem of increasing the support rigidity of the rear suspensions and the transmission efficiency of the rear-end collision load to the vehicle front side as above, a rear vehicle-body structure in which connecting frames that connect rear side housings and side sills to each other are disposed between the rear side housings and the side sills has been proposed as exemplified in Japanese Patent Laid-Open No. 2019-123456.

In the structure of Japanese Patent Laid-Open No. 2019-123456, a plurality of the connecting frames are disposed between the rear side housings and the side sills. Out of the plurality of frames, rear portions of inclined frame portions (191) are coupled to front ends of horizontal frame portions (192), and rear portions of second inclined members (350) are coupled to front ends of lower arm supporting members (260) positioned on the vehicle-width-direction inner side with respect to the horizontal frame portions (192) (see FIG. 4 in Japanese Patent Laid-Open No. 2019-123456).

In other words, the structure of Japanese Patent Laid-Open No. 2019-123456 employs a configuration in which a joined portion (hereinafter referred to as a "vehicle-width-direction outer-side joined portion") at which the rear portion of the inclined frame portion (191) is joined to the horizontal frame portion (192) and a joined portion (hereinafter referred to as a "vehicle-width-direction inner-side joined portion") at which the rear portion of the second inclined member (350) is joined to the lower arm supporting member (260) are disposed so as to be spaced apart from each other in the vehicle width direction (see the same drawing).

As a result, the structure of Japanese Patent Laid-Open No. 2019-123456 has a configuration that can efficiently transmit the rear-end collision load and a load transmitted from the vehicle rear side to the connecting frames such as an input load from a rear suspension when the vehicle travels to the side of the side sills on the vehicle front side while securely receiving the loads by the inclined frame portions (191) and the second inclined members (350) serving as connecting members as compared to a case where the vehicle-width-direction outer-side joined portions and the vehicle-width-direction inner-side joined portions match each other in the vehicle width direction.

However, in the structure of Japanese Patent Laid-Open No. 2019-123456, the rear portions of the inclined frame portion (191) and the second inclined member (350) are coupled to the lower arm supporting member (260) and the horizontal frame portion (192) that are different rigidity members, and the lower arm supporting member (260) and the horizontal frame portion (192) are connected to each other via a first reinforcement frame (290) and a second reinforcement frame (300) that are rigidity members included therebetween in the vehicle width direction (see the same drawing).

In other words, in the structure of Japanese Patent Laid-Open No. 2019-123456, the vehicle-width-direction outer-side joined portion and the vehicle-width-direction inner-side joined portion are composed of a plurality of rigidity members including the places therebetween in the vehicle width direction, and hence there is room for improvement in terms of further increasing the load transmission efficiency of transmitting the rear-end collision load and the input load from the rear suspension to the vehicle front side via the plurality of connecting frames while securely receiving the loads by the vehicle-width-direction outer-side joined portion and the vehicle-width-direction inner-side joined portion spaced apart from each other.

SUMMARY

The present disclosure thus provides a rear vehicle-body structure of a vehicle capable of securing the support rigidity of a rear suspension and effectively transmitting a rear-end collision load to a coupled body of a side sill and a pillar from a rear side housing (rigidity member).

The present disclosure is a rear vehicle-body structure of a vehicle, the rear vehicle-body structure including a rear side housing in which a lower arm supporting portion that supports a lower arm of a rear suspension and an upper arm supporting portion that supports an upper arm of the rear suspension are provided; a side sill that extends in a vehicle front-rear direction on a vehicle front side with respect to the rear side housing; and a pillar that extends in a vehicle up-down direction and has a lower portion joined to the side sill. In the rear vehicle-body structure, at least an upper frame and a lower frame that connect a rear end of a coupled body composed of the side sill and the pillar, and the rear side housing to each other are disposed to be spaced apart from each other in the vehicle up-down direction, an inclined angle at which the lower frame is inclined so as to be positioned closer to a vehicle inner side toward a vehicle rear side is set to be larger than an inclined angle at which the upper frame is inclined so as to be positioned closer to the vehicle inner side toward the vehicle rear side, a lower joined portion to which a rear end of the lower frame is joined is positioned on a vehicle-width-direction inner side with respect to an upper joined portion to which a rear end of the upper frame is joined in the rear side housing, and the rear side housing is composed of a single member including at least the lower joined portion and the upper joined portion.

According to the abovementioned configuration, by at least two connecting frames (the upper frame and the lower frame), the support rigidity of the rear suspension can be secured and the rear-end collision load can be effectively transmitted to the coupled body of the side sill and the pillar.

The upper frame is not limited to a shape that is inclined so as to be positioned closer to the vehicle inner side toward the vehicle rear side, and may have a shape that extends to be parallel to the vehicle front-rear direction or a shape that is inclined so as to be positioned closer to the vehicle outer side toward the vehicle rear side, for example.

As an aspect of the present disclosure, the rear side housing includes an upper raised wall including the upper joined portion, a lower raised wall included in a position spaced apart from the upper raised wall on the vehicle-width-direction inner side with respect to the upper raised wall and including the lower joined portion, and a step portion that extends in a vehicle width direction so as to connect the upper raised wall and the lower raised wall to each other, and is composed of a single member including at least the upper raised wall, the lower raised wall, and the step portion.

According to the abovementioned configuration, the rear side housing is composed of a single member including at least the upper raised wall, the lower raised wall, and the step portion, and hence the load transmission via the step portion between the upper joined portion and the lower joined portion spaced apart from each other in the vehicle width direction and the vehicle up-down direction can be efficiently performed.

Therefore, the load input to the rear side housing from the vehicle rear side at the time of a rear-end collision and the load input to the rear side housing from the rear suspension when the vehicle travels can be transmitted to the coupled body, in other words, the vehicle front side by the lower frame and the upper frame after being further effectively received by the lower joined portion and the upper joined portion spaced apart from each other in the vehicle width direction.

As an aspect of the present disclosure, a rear side frame that extends in the vehicle front-rear direction such that a front portion overlaps with the rear side housing when seen from a side of the vehicle and a rear portion is positioned on the vehicle rear side with respect to the rear side housing is provided, and the rear end of the upper frame and the front end of the rear side frame are joined to each other.

According to the abovementioned configuration, the rear-end collision load can be efficiently transmitted to the upper frame from the rear side frame.

As an aspect of the present disclosure, the front portion of the rear side frame is disposed on a corner portion between the step portion and the upper raised wall and is joined to the step portion and the upper raised wall.

According to the abovementioned configuration, the front portion of the rear side frame can be joined to the step portion and the upper raised wall in a state of being supported by the step portion while being placed along the upper raised wall from a side (in other words, the inner side or the outer side in the vehicle width direction).

Therefore, the front portion of the rear side frame can be firmly joined to the rear side housing. As a result, the transmission efficiency of the rear-end collision load from the rear side frame to the rear side housing can be further increased.

As an aspect of the present disclosure, a joined portion between the rear end of the upper frame and the front end of the rear side frame is provided in a position at which the joined portion at least partially overlaps with the upper arm supporting portion when seen from the side of the vehicle.

According to the abovementioned configuration, the load input to the upper arm supporting portion of the rear side housing from the upper arm of the rear suspension when the vehicle travels can be efficiently transmitted to the vehicle front-rear direction via the upper frame and the rear side frame by being received by the joined portion between the rear end of the upper frame and the front end of the rear side frame provided in a position at which the joined portion at least partially overlaps with the upper arm supporting portion when seen from a side of the vehicle.

As an aspect of the present disclosure, the rear end of the upper frame and the front end of the rear side frame are joined to each other at the joined portion via the rear side housing, and a rib that protrudes from a body side of the rear side housing is integrally formed on the joined portion in the rear side housing.

According to the abovementioned configuration, by the rib formed on the joined portion, the transmission efficiency of the rear-end collision load transmitted to the upper frame from the rear side frame via the joined portion of the rear side housing can be increased in addition to increasing the strength of the joined portion.

As an aspect of the present disclosure, the upper frame is joined to a position equivalent to the upper arm supporting portion, and the lower frame is joined to a position equivalent to the lower arm supporting portion.

According to the abovementioned configuration, by joining the upper frame to a position equivalent to the upper arm supporting portion, the load input to the rear side housing from the upper arm of the rear suspension via the upper arm supporting portion when the vehicle travels can be transmitted to the vehicle front side in a more efficient manner by the upper frame. Meanwhile, by joining the lower frame to a position equivalent to the lower arm supporting portion, the load input to the rear side housing from the lower arm via the lower arm supporting portion can be transmitted to the vehicle front side in a more efficient manner by the lower frame.

As an aspect of the present disclosure, the upper frame includes a first upper frame and a second upper frame positioned below the first upper frame.

According to the abovementioned configuration, by separately forming the upper frame by the first upper frame and the second upper frame, the plate thickness of the upper frame, the routing direction, the routing length, and the like are individually set in an easier manner in accordance with each of the joined sections as compared to a case where the first upper frame and the second upper frame are integrally formed.

Therefore, according to the abovementioned configuration, the support rigidity of the rear suspension can be secured and the rear-end collision load can be effectively transmitted to the coupled body of the side sill and the pillar while suppressing the increase of the vehicle body weight.

The upper frame is formed by separating the upper frame into the first upper frame and the second upper frame positioned below the first upper frame, but the upper frame is not limited to the configuration using two frames as described above and may employ a configuration separated into three or more frames. Needless to say, a case where the upper frame is formed by one frame without being separated into the vehicle upper side and lower side is also not excluded.

As an aspect of the present disclosure, a rear side frame that extends in the vehicle front-rear direction such that a rear portion is positioned on the vehicle rear side with respect to the rear side housing is provided, a rear end of the second upper frame and a front end of the rear side frame are joined to each other, and the second upper frame is formed to have a thicker plate thickness than the first upper frame.

According to the abovementioned configuration, the rear-end collision load can be efficiently transmitted from the rear side frame to the vehicle front side, in other words, the side of the side sill via the second upper frame of which plate thickness is thick.

As an aspect of the present disclosure, the side sill has a side sill closed cross-section portion formed therein, the side sill closed cross-section portion including a closed cross-sectional space that extends in the vehicle front-rear direction, the upper frame has a front end joined to a section in the coupled body corresponding to a rear end of the side sill closed cross-section portion, and is formed in an inclined manner so as to be positioned closer to a vehicle lower side as the upper frame approaches the vehicle front side, and the side sill closed cross-section portion is formed in an inclined manner so as to be positioned closer to an upper side as the side sill closed cross-section portion approaches the vehicle rear side to correspond to an inclination angle of the upper frame when seen from a side of the vehicle.

According to the abovementioned configuration, the transmitted load from the rear side housing can be efficiently transmitted to the side of the side sill via the connecting frame without causing the transmitted load to be concentrated on the joined portion between the front end of the connecting frame and the rear end of the side sill closed cross-section portion.

Therefore, according to the abovementioned configuration, the support rigidity of the rear suspension and the transmission efficiency of the rear-end collision load to the vehicle front side can be increased.

As an aspect of the present disclosure, a lower edge portion of a door opening is formed in an inclined manner so as to be positioned closer to the upper side as the lower edge portion approaches the vehicle rear side to correspond to an inclination angle of the side sill closed cross-section portion when seen from a side of the vehicle.

According to the abovementioned configuration, the vehicle front side can be positioned at a place lower than the vehicle rear side by forming the lower edge portion of the door opening in an inclined manner such that the lower edge portion is positioned closer to the upper side as the lower edge portion approaches the vehicle rear side along the side sill closed cross-section portion. As a result, the leg and the like of an occupant hit the lower edge portion of the door opening less easily and the occupant can smoothly perform the boarding and the alighting when the occupant boards on and alights from the vehicle cabin via the door opening while an inadvertent increase in size of the door opening can be suppressed.

As an aspect of the present disclosure, both of the rear ends of the upper frame and the lower frame are integrally joined to the rear side housing as vehicle body parts.

According to the abovementioned configuration, both of the rear ends of the upper frame and the lower frame can suppress the concentration of the rear-end collision load on the upper joined portion and the lower joined portion and further increase the transmission efficiency of the rear-end collision load as compared to a case where the rear ends of the upper frame and the lower frame are mounted on the rear side housing later by fastening and the like with use of vehicle parts after the assembling of the vehicle body is finished.

As an aspect of the present disclosure, the rear side housing is composed of a single member in an integral manner, the single member including at least the lower arm supporting portion, the upper arm supporting portion, the upper joined portion, and the lower joined portion.

According to the abovementioned configuration, the rigidity of the rear side housing can be increased as compared to a case where a plurality of member are combined, and hence the support rigidity of the rear suspension and the transmission efficiency of the rear-end collision load to the vehicle front side can be further increased.

According to the abovementioned configuration, the support rigidity of the rear suspension can be secured, and the rear-end collision load can be effectively transmitted to the coupled body of the side sill and the pillar from the rear side housing.

DETAILED DESCRIPTION

One embodiment of the present disclosure is described with the drawings below.

A vehicle of this embodiment is a sports car that employs a so-called space frame structure that forms a vehicle body framework by connecting a plurality of frames made of aluminum alloy that are extrusion-molded, and a center-pillarless structure having two-door-type side doors. A rear vehicle-body structure of the vehicle as above is described with reference to FIG. 1 to FIG. 7. However, the rear vehicle-body structure of the vehicle of this embodiment has a bilaterally symmetric shape, and hence the structure on the vehicle right side is mainly described.

Figure 1:
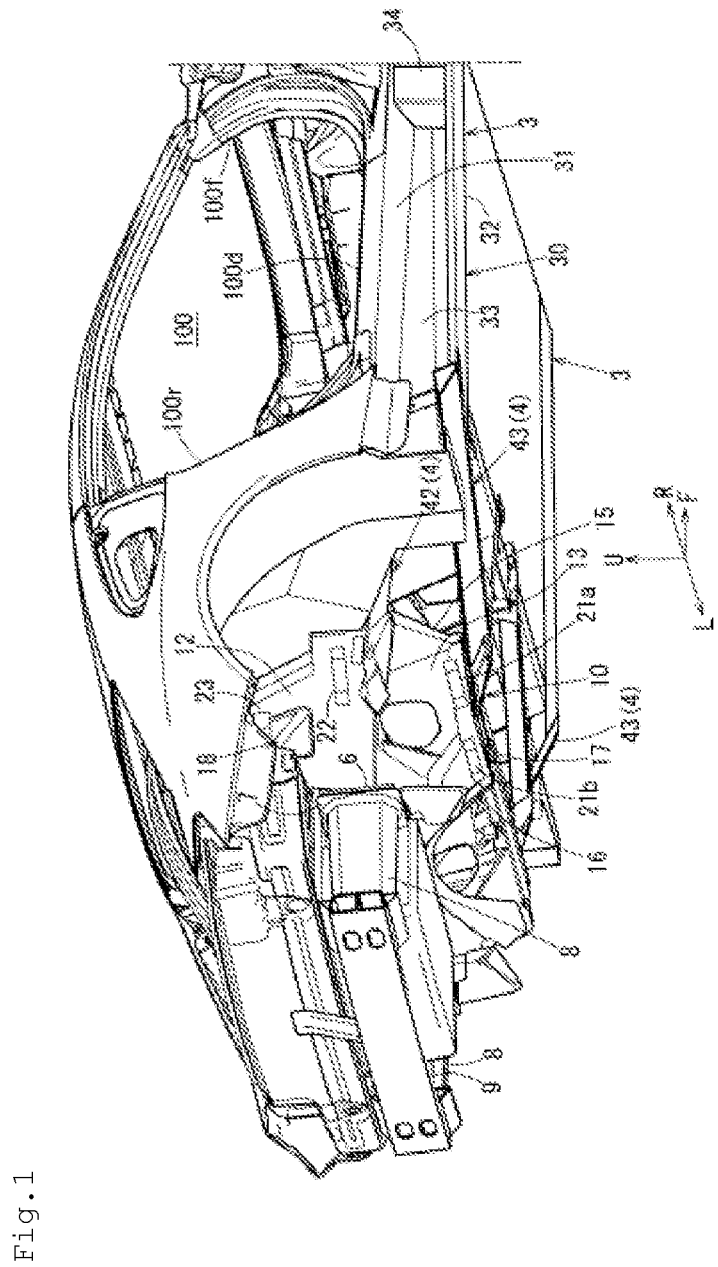
FIG. 1 is an external view illustrating the main part of a vehicle including a rear vehicle-body structure of an embodiment of the present disclosure.
Figure 2:
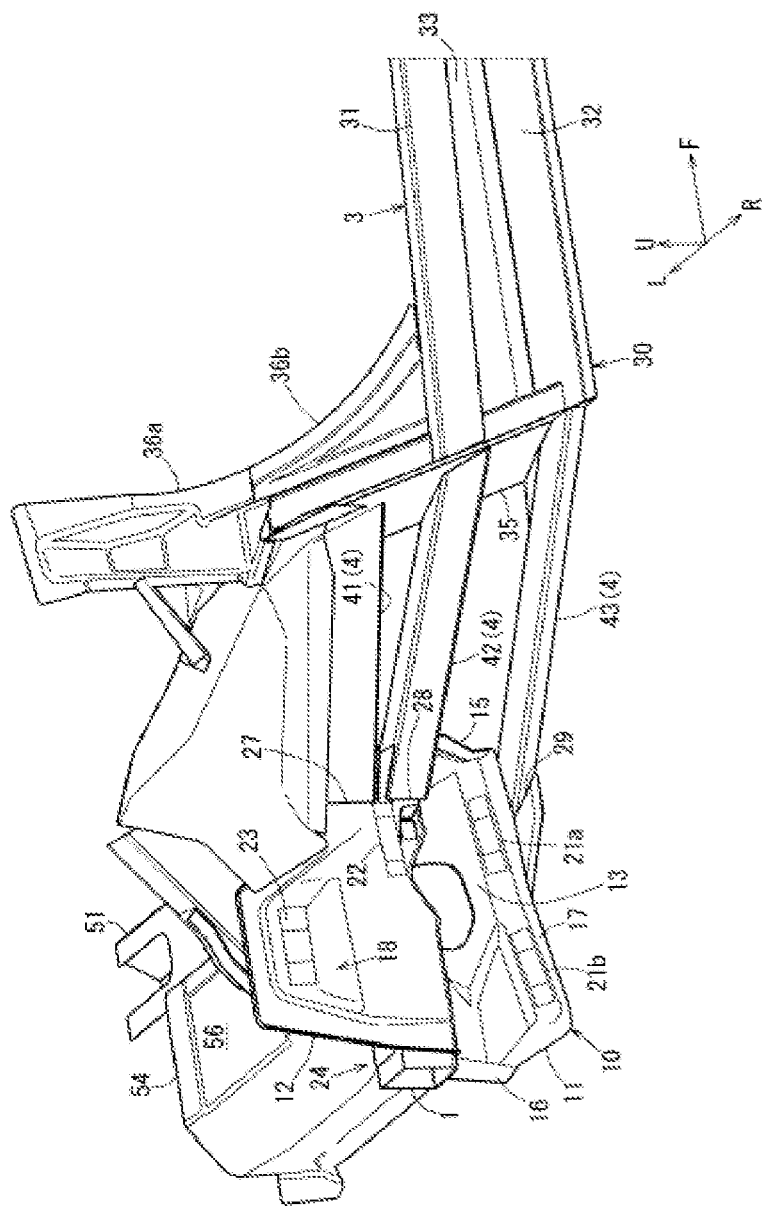
FIG. 2 is a perspective view of the rear vehicle-body structure of the vehicle of this embodiment seen from the vehicle-width-direction outer side and the vehicle rear side.
Figure 6:
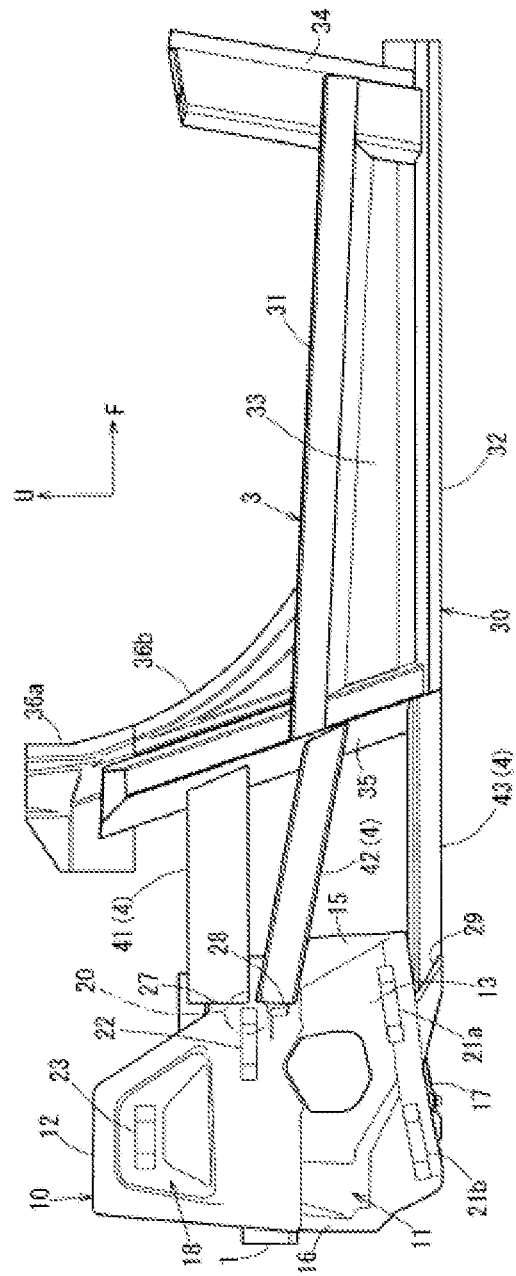
FIG. 6 is a right side view of the main part of the rear vehicle-body structure of the vehicle of this embodiment.

In order to clarify the illustrations, in the drawings, the illustrations of a rear suspension, a rear wheel, and the like are omitted, and detailed illustrations of lower arm supporting portions 21a and 21b (a lower arm front-side supporting portion 21a and a lower arm rear-side supporting portion 21b), an upper arm supporting portion 22, and a damper supporting portion 23 are omitted in FIG. 1, FIG. 2, and FIG. 6.

In the drawings, arrow F indicates the vehicle front direction, arrow R indicates the vehicle right direction, arrow L indicates the vehicle left direction, and arrow U indicates the vehicle upper direction.

Although not shown, the rear vehicle-body structure of the vehicle of this embodiment includes double wishbone rear suspensions on both of left and right sides so as to correspond to left and right rear wheels, and each of the rear suspensions includes a rear suspension damper, an upper arm, and a lower arm.

As illustrated in FIG. 1, the rear vehicle-body structure of the vehicle of this embodiment includes rear side frames 1 (see FIG. 2 to FIG. 7), rear side housings 10, side sills 3, and connecting frames 4.

As illustrated in FIG. 2 to FIG. 7, the rear side frame 1 is an extruded member made of aluminum alloy that is extrusion-molded, linearly extends in the vehicle front-rear direction, and is formed to have a tubular body of which cross-section orthogonal to the longitudinal direction is substantially rectangular.

The rear side frames 1 extend on both sides of a vehicle body rear portion to be substantially parallel with the vehicle front-rear direction so as to protrude from the front side of the rear side housings 10 to a place on the vehicle rear side with respect to rear ends of the rear side housings 10.

As illustrated in FIG. 1, front ends of a pair of left and right main crash cans 8 composed of tubular bodies and the like that absorb the impact at the time of a collision are connected to rear ends of the rear side frames 1 via set plates 6 and mounting plates 7. Rear ends of the pair of left and right main crash cans 8 are connected to each other by a bumper reinforcement 9.

As illustrated in FIG. 3 to FIG. 7, the rear side housings 10 are provided in positions that substantially overlap with the rear suspensions when seen from a side of the vehicle so as to be able to support the rear suspensions from the vehicle-width-direction inner side, and are manufactured by die-cast-molding aluminum alloy, for example.

On a lower portion of the rear side housing 10, a lower bulge 11 at which substantially all of the lower portion bulges out to the vehicle-width-direction inner side with respect to an upper portion is formed. Specifically, the rear side housing 10 includes an upper raised wall 12, a lower raised wall 13 included in a position spaced apart from the upper raised wall 12 to the vehicle-width-direction inner side, and a step portion 14 (see FIG. 4) that substantially horizontally extends in the vehicle width direction so as to connect a lower end of the upper raised wall 12 and an upper end of the lower raised wall 13 to each other in the vehicle width direction.

As illustrated in FIG. 1 to FIG. 5 and FIG. 7, a front wall portion 15 (see FIG. 1 to FIG. 4 and FIG. 6) is formed on a front end of the lower raised wall 13, and a rear wall portion 16 (see FIG. 1, FIG. 2, FIG. 4, and FIG. 6) is formed on a rear end thereof along the vehicle up-down direction so as to protrude to the vehicle-width-direction outer side. As illustrated in FIG. 1 and FIG. 2, a lower wall 17 (see FIG. 1, FIG. 2, and FIG. 6) is formed on a lower end of the lower raised wall 13 along the vehicle front-rear direction so as to protrude to the vehicle-width-direction outer side in a flange-like manner The lower bulge 11 includes the lower raised wall 13, the step portion 14, the front wall portion 15, the rear wall portion 16, and the lower wall 17.

As illustrated in FIG. 1, FIG. 2, and FIG. 4 to FIG. 6, an upper bulge 18 bulging out to the vehicle-width-direction inner side is formed in a central portion of the upper raised wall 12 equivalent to the upper portion of the rear side housing 10 when seen from a side of the vehicle. The upper bulge 18 is formed in a hollow shape such that the inside is opened to the vehicle-width-direction outer side as with the lower bulge 11.

As illustrated in FIG. 2 and FIG. 6, on the lower portion of a vehicle-width-direction outer surface of the rear side housing 10, the lower arm front-side supporting portion 21a and the lower arm rear-side supporting portion 21b that pivotably support the lower arm (not shown) having an A-shape in plan view are provided.

The lower arm front-side supporting portion 21a pivotably supports a vehicle-width-direction inner end of the lower arm on the vehicle front side thereof, and the lower arm rear-side supporting portion 21b pivotably supports a vehicle-width-direction inner end of the lower arm on the vehicle rear side thereof. The lower arm front-side supporting portion 21a and the lower arm rear-side supporting portion 21b are provided on a lower portion of the lower raised wall 13 of the rear side housing 10 so as to be spaced apart from each other in the vehicle front-rear direction.

The upper arm supporting portion 22 that pivotably supports a vehicle-width-direction inner end of the upper arm (not shown) having an I-shape in plan view is provided in a position in the middle in the vehicle up-down direction and on the vehicle front side of the vehicle-width-direction outer surface of the rear side housing 10, in other words, in a position on the front side of the lower portion of the upper raised wall 12 of the rear side housing 10.

The damper supporting portion 23 that pivotably supports an upper end portion of the rear suspension damper (not shown) that extends along the vehicle up-down direction in an inclined posture so as to be positioned closer to the vehicle-width-direction inner side as the rear suspension damper approaches the vehicle upper side is provided on the upper portion of the rear side housing 10, in other words, in a middle position in the vehicle-width-direction outer surface of the upper portion of the upper raised wall 12 of the rear side housing 10 in the vehicle front-rear direction.

Figure 4:
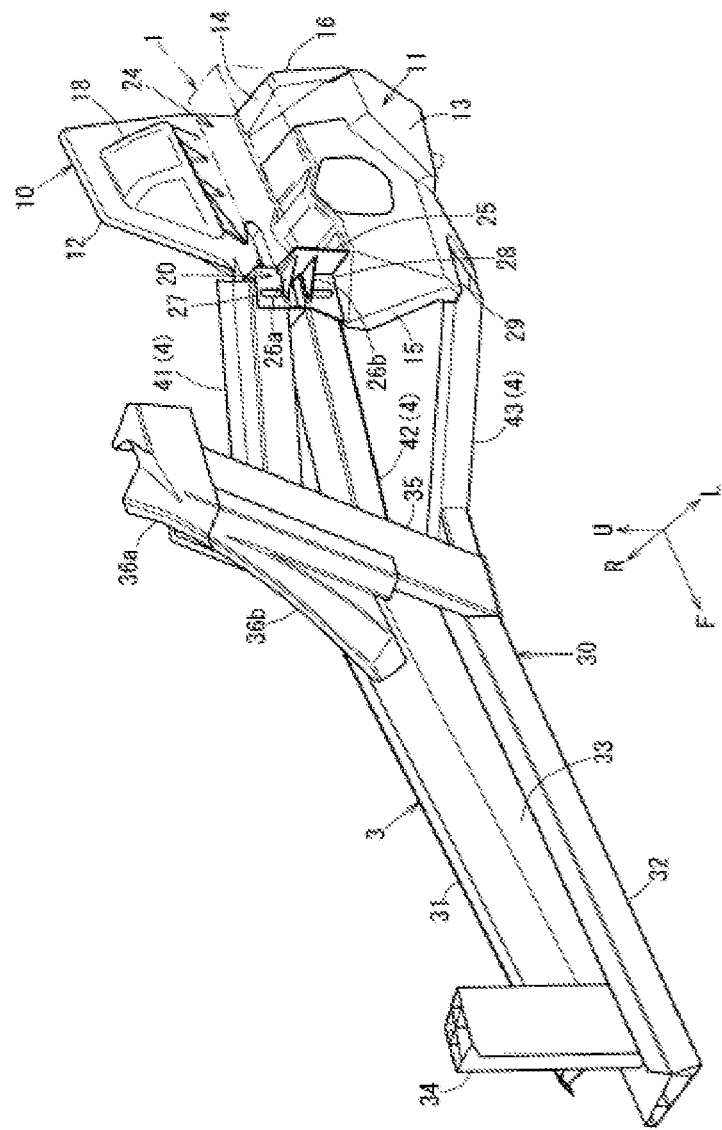
FIG. 4 is a perspective view illustrating the main part in a state in which members between left and right rear side housings are removed in FIG. 3.
Figure 5:
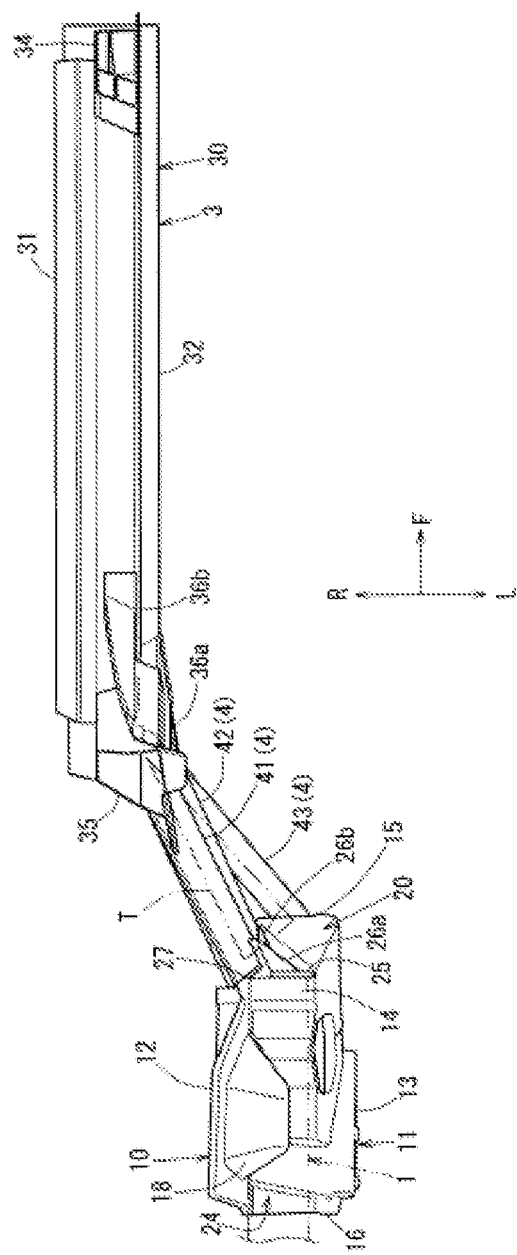
FIG. 5 is a plan view of the main part of the rear vehicle-body structure of the vehicle of this embodiment.

As particularly illustrated in FIG. 4 and FIG. 5, the rear side frame 1 is disposed on a corner portion 24 between the upper raised wall 12 and the step portion 14 of the rear side housing 10.

Figure 3:
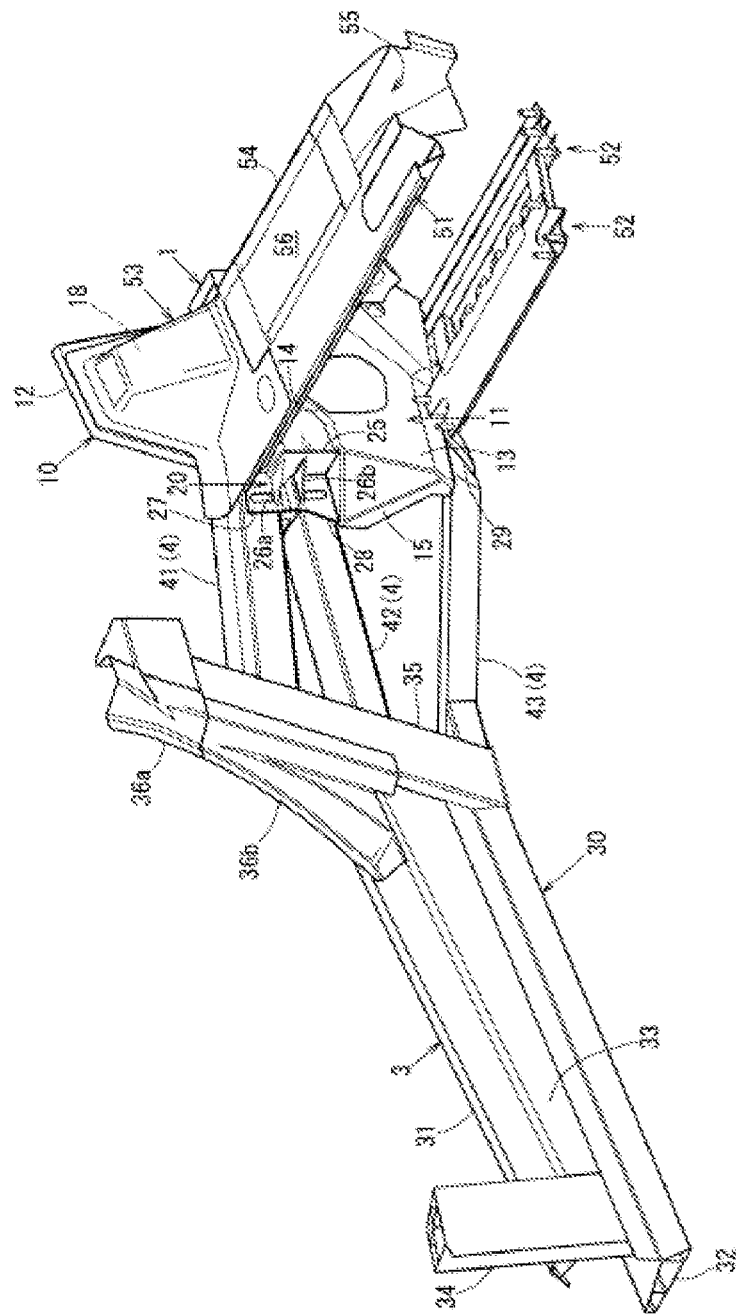
FIG. 3 is a perspective view of the rear vehicle-body structure of the vehicle of this embodiment seen from the vehicle-width-direction inner side and the vehicle front side.

Specifically, the upper raised wall 12 of the rear side housing 10 is formed to be longer than the rear side frame 1 in the vehicle up-down direction, and the step portion 14 of the rear side housing 10 is formed so as to have a longer length than the rear side frame 1 in the vehicle width direction (see FIG. 3).

As a result, the rear side frame 1 abuts against the upper raised wall 12 from the vehicle-width-direction inner side and is placed on the step portion 14 so as to be able to be supported by the step portion 14 at the corner portion 24 between the upper raised wall 12 and the step portion 14 in the rear side housing 10. At the corner portion 24 between the upper raised wall 12 and the step portion 14, the rear side housing 10 and the rear side frame 1 are integrally joined to each other by welding and the like.

As illustrated in FIG. 3 to FIG. 5 and FIG. 7, a first rib 25 that partitions the corner portion 24 in the vehicle front-rear direction is integrally formed on a front portion of the corner portion 24 between the upper raised wall 12 and the step portion 14 of the rear side housing 10. The first rib 25 is formed to protrude to the vehicle-width-direction inner side from the upper raised wall 12 and is formed to protrude to the vehicle upper side from the step portion 14.

The rear side frame 1 that extends in the vehicle front-rear direction is disposed at the corner portion 24 between the upper raised wall 12 and the step portion 14 of the rear side housing 10 such that a front end surface abuts against a rear surface of the first rib 25. The abutting portions of the rear surface of the first rib 25 and the front end surface of the rear side frame 1 are integrally joined to each other by welding and the like.

Second ribs 26a and 26b are integrally formed on the upper raised wall 12 of the rear side housing 10 at a place closer to the vehicle front side than the first rib 25 (see FIG. 3 and FIG. 4). The second ribs 26a and 26b are disposed by a plurality of numbers (two in this example) so as to be spaced apart from each other in the vehicle up-down direction, and are formed to protrude to the vehicle-width-direction inner side from the upper raised wall 12 so as to connect the upper raised wall 12 and the first rib 25 to each other.

A section in which the first rib 25 and the plurality of the second ribs 26a and 26b are formed when seen from a side of the vehicle and peripheral sections thereof on a vehicle-width-direction inner surface of the upper raised wall 12 of the rear side housing 10 are set as a rib forming region 20.

As illustrated in FIG. 2, FIG. 5, and FIG. 6, rear ends of three connecting frames 4 described below are joined to a front portion of the rear side housing 10 from the vehicle-width-direction outer surface side.

Specifically, as illustrated in FIG. 2 and FIG. 6, a first upper frame rear-end joined portion 27 for joining a rear end of a first upper frame 41 described below positioned on the uppermost side out of the three connecting frames 4 is provided on the front portion of the rear side housing 10 and a middle portion thereof in the vehicle up-down direction. The first upper frame rear-end joined portion 27 is provided on the lower front side of the upper raised wall 12 of the rear side housing 10 on the vehicle-width-direction outer side thereof, in other words, a peripheral portion on the front side and the upper side of the upper arm supporting portion 22.

A second upper frame rear-end joined portion 28 for joining a rear end of a second upper frame 42 described below positioned between the other two connecting frames, that is, the connecting frame 41 and a connecting frame 43 in the vehicle up-down direction out of the three connecting frames 4 is provided on the front portion of the rear side housing 10 and the middle portion thereof in the vehicle up-down direction. The second upper frame rear-end joined portion 28 is provided on the lower front side of the upper raised wall 12 of the rear side housing 10 on the vehicle-width-direction outer side thereof, in other words, a peripheral portion on the front side and the lower side of the upper arm supporting portion 22.

A lower frame rear-end joined portion 29 for joining a rear end of the lower frame 43 described below positioned on the lowermost side out of the three connecting frames 4 is provided on the front portion and the lower portion of the rear side housing 10. The lower frame rear-end joined portion 29 is provided on the lower front side of the lower raised wall 13 of the rear side housing 10 on the vehicle-width-direction outer side thereof, in other words, a lower peripheral portion of the lower arm front-side supporting portion 21a.

As described above, both of the first upper frame rear-end joined portion 27 and the second upper frame rear-end joined portion 28 are provided so as to be adjacent to each other on upper and lower sides at a front peripheral portion of the upper arm supporting portion 22 of the rear side housing 10 (see FIG. 2 and FIG. 6).

As a result, as illustrated in FIG. 3 to FIG. 5 and FIG. 7, a front end of the rear side frame 1 and each of rear ends of the first upper frame 41 and the second upper frame 42 are joined to each other via the rear side housing 10. Specifically, both of the first upper frame rear-end joined portion 27 and the second upper frame rear-end joined portion 28 are each formed to have a height that at least partially overlaps with the rear side frame 1 in the vehicle up-down direction. While the rear side frame 1 is positioned on the vehicle-width-direction inner side with respect to the upper raised wall 12 of the rear side housing 10, both of the first upper frame rear-end joined portion 27 and the second upper frame rear-end joined portion 28 are positioned on the vehicle-width-direction outer side of the upper raised wall 12 (see FIG. 7).

Therefore, the rear side housing 10 is interposed between the front end of the rear side frame 1 and a rear end (27) of the first upper frame 41 (in other words, a coupling portion) in the vehicle width direction and the vehicle front-rear direction.

Similarly, the rear side housing 10 is interposed between the front end of the rear side frame 1 and a rear end (28) of the second upper frame 42 (in other words, a coupling portion) in the vehicle width direction and the vehicle front-rear direction.

Figure 7:
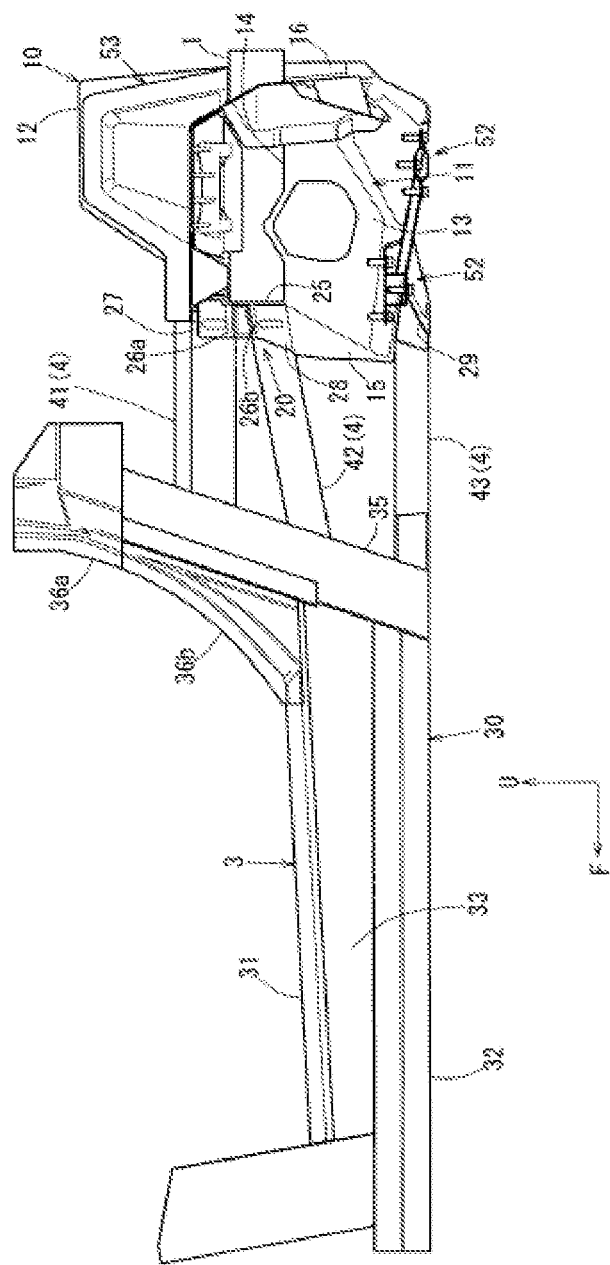
FIG. 7 is a view of the rear vehicle-body structure of the vehicle of this embodiment seen from the vehicle-width-direction inner side.

As illustrated in FIG. 3, FIG. 4, and FIG. 7, the rib forming region 20 in the rear side housing 10 is formed across the coupling portion between the front end of the rear side frame 1 and the rear end of the first upper frame 41 and the coupling portion between the front end of the rear side frame 1 and the rear end of the second upper frame 42 in the rear side housing 10.

As described above, by forming the rib forming region 20 on the coupling portion between the front end of the rear side frame 1 and the rear end of the first upper frame 41 and the coupling portion between the front end of the rear side frame 1 and the rear end of the second upper frame 42 in the rear side housing 10, the transmission efficiency of the rear-end collision load from the front end of the rear side frame 1 to the upper raised wall 12 via the first rib 25 and the second ribs 26a and 26b can be increased.

The transmission efficiency of the rear-end collision load from the rear side frame 1 to the first upper frame 41 and the second upper frame 42 via the rear side housing 10 is also increased.

The upper arm supporting portion 22 is formed on the vehicle-width-direction outer surface side of the rear side housing 10, and the rib forming region 20 is provided in a place that is on the vehicle-width-direction inner surface side of the rear side housing 10 and that overlaps (matches) with the upper arm supporting portion 22 when seen from a side of the vehicle (see FIG. 6).

As a result, the rib forming region 20 also contributes to the improvement of the support rigidity of the upper arm against the load input to the rear side housing 10 from the upper arm via the upper arm supporting portion 22 when the vehicle travels.

The upper arm supporting portion 22 is positioned on a coupling portion (20) between the front end of the rear side frame 1 and the rear end of the first upper frame 41 and a coupling portion (20) between the front end of the rear side frame 1 and the rear end of the second upper frame 42 in the rear side housing 10 when seen from a side of the vehicle.

In the coupling portions (20) as above, the plurality of frames 1, 41, and 42 are densely disposed as compared to peripheral portions, and hence the coupling portions (20) are equivalent to a section of which rigidity is high out of the rear side housing 10. In this embodiment, the upper arm supporting portion 22 is provided in a section that overlaps with the coupling portions (20) in the rear side housing 10 as above when seen from a side of the vehicle. As a result, the support rigidity of the upper arm against the load input to the rear side housing 10 from the upper arm via the upper arm supporting portion 22 when the vehicle travels can be effectively increased.

As illustrated in FIG. 1 to FIG. 7, the side sills 3 are extruded members made of aluminum alloy that is extrusion-molded and are disposed to be spaced apart from the rear side housings 10 corresponding to the left side and the right side thereof to the vehicle front side and the vehicle-width-direction outer sides. The side sills 3 are disposed along the vehicle front-rear direction on both sides of a floor panel (not shown) forming a vehicle bottom surface on the front side of the rear side housings 10.

Each of the side sills 3 includes closed cross-section portions 31 and 32 disposed to be spaced apart from each other on the vehicle upper side and lower side, and a connecting wall 33 that connects the closed cross-section portions 31 and 32 on the upper and lower sides to each other.

The closed cross-section portions 31 and 32 on the upper and lower sides (the upper closed cross-section portion 31 and the lower closed cross-section portion 32) each have a closed cross-sectional space that extends along the entire length of the side sill 3 in the vehicle front-rear direction on the inside thereof.

On the vehicle-width-direction inner side of the side sill 3, the connecting wall 33 linearly extends in the vehicle up-down direction so as to connect a lower end of a vehicle-width-direction inner wall of the upper closed cross-section portion 31 and an upper end of a vehicle-width-direction inner wall of the lower closed cross-section portion 32 to each other and linearly extends across substantially the entire length of the side sill 3 in the vehicle front-rear direction except for the vehicle front side and rear side.

The closed cross-section portions 31 and 32 on the upper and lower sides each have a vehicle-width-direction outer end that is formed to be longer in the vehicle width direction than in the vehicle up-down direction so as to protrude to the vehicle-width-direction outer side than vehicle-width-direction outer ends of a hinge pillar 34 and a rear pillar 35 described below (see FIG. 5). Each of the closed cross-section portions 31 and 32 on the upper and lower sides is formed to have a tapered shape of which space in the vehicle up-down direction gradually decreases as the tapered shape approaches the vehicle-width-direction outer side.

As particularly illustrated in FIG. 6, while the lower closed cross-section portion 32 extends to be substantially parallel to the vehicle front-rear direction, the upper closed cross-section portion 31 linearly extends in an inclined manner so as to be positioned closer to the upper side as the upper closed cross-section portion 31 approaches the vehicle rear side. The entirety of the upper closed cross-section portion 31 including the rear end portion is disposed in a lower position than the rear side frame 1 disposed on the vehicle rear side. In this embodiment, the upper closed cross-section portion 31 is formed at an inclination angle at which a virtual straight line extending from a rear end portion to the vehicle rear side extends toward the front portion of the rear side frame 1.

On a front end of the side sill 3, the hinge pillar 34 that extends along the vehicle up-down direction is provided in a rising manner The hinge pillar 34 is an extruded member made of aluminum alloy that is extrusion-molded so as to have a closed cross-sectional space that linearly extends along the vehicle up-down direction on the inside thereof, and is provided on the lower closed cross-section portion 32 in a rising manner so as to protrude to the vehicle upper side from the upper closed cross-section portion 31 in an inclined posture so as to be positioned closer to the vehicle front side as hinge pillar 34 approaches the vehicle upper side.

The hinge pillar 34 is integrally joined at sections facing the upper closed cross-section portion 31, the connecting wall 33, and the lower closed cross-section portion 32 by arc welding and the like.

As illustrated in FIG. 3 to FIG. 7, on a rear end of the side sill 3, the rear pillar 35 (C-pillar) that extends along the vehicle up-down direction is provided in a rising manner The rear pillar 35 is an extruded member made of aluminum alloy that is extrusion-molded so as to have a closed cross-sectional space that linearly extends along the vehicle up-down direction on the inside thereof, and is provided on the lower closed cross-section portion 32 in a rising manner so as to protrude to the vehicle upper side from the upper closed cross-section portion 31 in an inclined posture so as to be positioned closer to the vehicle rear side as the rear pillar 35 approaches the vehicle upper side. The rear pillar 35 is integrally joined at sections facing the upper closed cross-section portion 31, the lower closed cross-section portion 32, and the connecting wall 33 by arc welding and the like.

In the description below, the integrally joined side sill 3 and rear pillar 35 are also collectively referred to as a coupled body 30. Reference characters 36a and 36b in FIG. 2 to FIG. 7 denote rear pillar reinforcements that reinforce the rear pillar 35 itself and the joined portion between the rear pillar 35 and the side sill 3.

As illustrated in FIG. 1, each of the side sills 3 is formed along a lower edge 100d of a door opening 100 for the boarding and alighting of an occupant formed in a side of the vehicle as an opening. Similarly, the hinge pillar 34 is formed along a front edge 100f of the door opening 100, and the rear pillar 35 is formed along a rear edge 100r of the door opening 100.

An upper edge of the side sill 3, in other words, the upper closed cross-section portion 31 is formed in an inclined manner so as to be positioned closer to the vehicle upper side as the upper edge approaches the vehicle rear side as described above (see FIG. 6). Therefore, as illustrated in FIG. 1, the lower edge 100d of the door opening 100 is also accordingly formed in an inclined manner so as to be positioned closer to the vehicle upper side as the lower edge 100d approaches the vehicle rear side. The vehicle in this embodiment does not include a center pillar, and hence the door opening 100 is formed as an opening without being partitioned in the vehicle front-rear direction by the center pillar (see FIG. 1).

Next, the connecting frames 4 are described. The connecting frames 4 linearly extend along the vehicle front-rear direction between the coupled body 30 composed of the side sill 3 and the rear pillar 35, and the rear side housing 10 so as to connect the coupled body 30 and the rear side housing 10 to each other. The connecting frames 4 (41, 42, and 43) include a plurality of numbers and are disposed to be spaced apart from each other in the vehicle up-down direction.

Specifically, as illustrated in FIG. 2 to FIG. 7, the connecting frames 4 include three frames, that is, the first upper frame 41, the second upper frame 42, and the lower frame 43 on each of the left and right sides of the vehicle body rear portion and are disposed from the vehicle upper side to the lower side in the stated order.

The first upper frame 41 is disposed to be substantially horizontal at a position in the rear pillar 35 on the vehicle upper side with respect to an upper end of the side sill 3. A front end of the first upper frame 41 is joined at a position on the vehicle upper side with respect to the upper end of the side sill 3 from the rear surface of the rear pillar 35. A rear end of the first upper frame 41 is joined to the first upper frame rear-end joined portion 27 included on the rear side housing 10 at a slightly higher position than the upper arm supporting portion 22 from the vehicle-width-direction outer surface side.

As illustrated in FIG. 6 and FIG. 7, the second upper frame 42 extends to be inclined when seen from a side of the vehicle so as to be positioned closer to the vehicle upper side as the second upper frame 42 approaches the vehicle rear side. A front end of the second upper frame 42 is joined at a position equivalent to a rear end of the upper closed cross-section portion 31 in the side sill 3 in the vehicle up-down direction from the rear surface of the rear pillar 35. A rear end of the second upper frame 42 is joined to the second upper frame rear-end joined portion 28 included on the rear side housing 10 at a slightly lower position than the upper arm supporting portion 22 from the vehicle-width-direction outer surface side.

The lower frame 43 is horizontally disposed in side view at a position of the lower closed cross-section portion 32 of the side sill 3 in the rear pillar 35 and a position lower than the lower arm front-side supporting portion 21a. A front end of the lower frame 43 is joined at a position equivalent to a rear end of the lower closed cross-section portion 32 of the side sill 3 from the rear surface of the rear pillar 35. A rear end of the lower frame 43 is joined to the lower frame rear-end joined portion 29 positioned directly above the lower arm front-side supporting portion 21 in the rear side housing 10 from the vehicle-width-direction outer surface side.

The three connecting frames 4 are integrally joined to the coupled body 30 and the rear side housing 10 by MIG welding, for example. As a result, the three connecting frames 4 are formed as vehicle body parts integrally assembled when the vehicle body is assembled unlike vehicle parts that are mounted later by a bolt and the like with use of a bracket and the like.

As particularly illustrated in FIG. 7, both of the rear ends of the first upper frame 41 and the second upper frame 42 at least partially overlap with the front end of the rear side frame 1 in the vehicle up-down direction as described above. However, in this embodiment, the second upper frame 42 is disposed so as to overlap with the rear side frame 1 more in the vehicle up-down direction as compared to the first upper frame 41.

Therefore, the second upper frame 42 is formed to be able to transmit a larger rear-end collision load to the vehicle front side from the rear side frame 1 via the rear side housing 10 as compared to the first upper frame 41.

As described above, the second upper frame 42 as above is formed in an inclined manner so as to be positioned closer to the vehicle lower side as the second upper frame 42 approaches the vehicle front side (see FIG. 6 and FIG. 7). As described above, in correspondence to the above (in correspondence to an inclination angle of the second upper frame 42 when seen from a side of the vehicle), the upper closed cross-section portion 31 of the side sill 3 is formed in an inclined manner so as to be positioned closer to the upper side as the upper closed cross-section portion 31 approaches the vehicle rear side so as to become closer to the inclination angle of the second upper frame 42 as much as possible. In addition, the front end of the second upper frame 42 and the rear end of the upper closed cross-section portion 31 of the side sill 3 are joined to the rear pillar 35 at substantially same heights. As a result, in this embodiment, a load transmission passage (closed cross-section structure) that extends in a manner that is as linear as possible in an inclined manner so as to be positioned closer to the lower side as the load transmission passage approaches the vehicle front side when seen from a side of the vehicle can be formed from the rear end (28) of the second upper frame 42 to the front end of the upper closed cross-section portion 31 of the side sill 3.

As described above, a larger rear-end collision load is transmitted to the second upper frame 42 from the rear side frame 1 via the rear side housing 10 as compared to the first upper frame 41, and hence the second upper frame 42 is formed to have the thickest plate thickness as compared with the first upper frame 41 and the lower frame 43.

Specifically, both of the first upper frame 41 and the second upper frame 42 are formed to have a tubular shape of which cross-section orthogonal to the longitudinal direction is substantially rectangular, and the first upper frame 41 has wall surfaces that correspond to those of the second upper frame 42 and are each formed to have a plate thickness that is about 1.5 times as thick as that of the wall surfaces of the second upper frame 42, for example.

As particularly illustrated in FIG. 5 out of FIG. 3 to FIG. 5, the lower frame 43, the first upper frame 41, and the second upper frame 42 all linearly extend in an inclined manner so as to be positioned closer to the vehicle-width-direction inner side as the lower frame 43, the first upper frame 41, and the second upper frame 42 approach the vehicle rear side. However, the lower frame 43 is formed to be inclined by a large degree so as to be positioned closer to the vehicle-width-direction inner side as the lower frame 43 approaches the vehicle rear side more than the first upper frame 41 and the second upper frame 42 in a plan view of the vehicle. In this embodiment, the first upper frame 41 and the second upper frame 42 are formed at substantially the same inclination angles in a plan view of the vehicle.

As described above, the lower frame 43 is formed to be inclined by a large degree so as to be positioned closer to the vehicle-width-direction inner side as the lower frame 43 approaches the vehicle rear side more than the first upper frame 41 and the second upper frame 42 in a plan view of the vehicle. Accordingly, the lower frame rear-end joined portion 29 in the rear side housing 10 to which the rear end of the lower frame 43 is joined is positioned closer to the vehicle-width-direction inner side as compared to the first upper frame rear-end joined portion 27 to which the rear end of the first upper frame 41 is joined and the second upper frame rear-end joined portion 28 to which the rear end of the second upper frame 42 is joined (see FIG. 5).

Specifically, as described above, in the rear side housing 10, the lower raised wall 13 and the upper raised wall 12 are disposed to be spaced apart from each other on the inner side and the outer side in the vehicle width direction, the lower frame rear-end joined portion 29 is positioned on the lower raised wall 13 positioned on the vehicle-width-direction inner side, and the first upper frame rear-end joined portion 27 and the second upper frame rear-end joined portion 28 are positioned on the upper raised wall 12 positioned on the vehicle-width-direction outer side.

As described above, in the rear side housing 10, the upper raised wall 12, the lower raised wall 13, and the step portion 14 are composed of a single member in an integral manner by die-cast-molding aluminum alloy.

In other words, as described above, substantially the entirety of the rear side housing 10 including the lower arm supporting portions 21a and 21b, the upper arm supporting portion 22, the damper supporting portion 23, the first upper frame rear-end joined portion 27, the second upper frame rear-end joined portion 28, the lower frame rear-end joined portion 29, and the second upper frame rear-end joined portion 28 is composed of a single member in an integral manner.

As illustrated in FIG. 2, FIG. 3, and FIG. 7, cross members 51 and 52 (an upper cross member 51 and a lower cross member 52 (see FIG. 3 and FIG. 7)) are included on the upper side and the lower side between the pair of left and right rear side housings 10.

The upper cross member 51 is an extruded member made of aluminum alloy that is extrusion-molded so as to have a closed cross-sectional space that linearly extends in the vehicle width direction and has outer ends in the vehicle width direction that are connected to the rear side housings 10 corresponding to the left side and the right side thereof via connecting panels 53 (see FIG. 3 and FIG. 7).

The upper cross member 51 is formed to have a cross-section orthogonal to the vehicle width direction that has a hat-shaped profile. Reference character 54 in FIG. 2 and FIG. 3 denotes a partition panel that serves as a partition between an accessory accommodating space 55 that accommodates accessories such as a differential gear and a trunk space 56.

The rear vehicle-body structure of the vehicle of this embodiment described above is the rear vehicle-body structure of the vehicle including: the rear side housing 10 in which the lower arm supporting portions 21a and 21b that support the lower arm (not shown) of the rear suspension and the upper arm supporting portion 22 that supports the upper arm (not shown) of the rear suspension are provided; the side sill 3 that extends in the vehicle front-rear direction on the vehicle front side with respect to the rear side housing 10; and the rear pillar 35 (pillar) that extends in the vehicle up-down direction and has a lower portion joined to the side sill 3. In the rear vehicle-body structure, at least the first upper frame 41 and the second upper frame 42 (upper frame) and the lower frame 43 that connect the rear end of the coupled body 30 composed of the side sill 3 and the rear pillar 35, and the rear side housing 10 to each other are disposed to be spaced apart from each other in the vehicle up-down direction (see FIG. 2 to FIG. 4, FIG. 6, and FIG. 7), the inclined angle at which the lower frame 43 is inclined so as to be positioned closer to the vehicle-width-direction inner side toward the vehicle rear side is set to be larger than the inclined angles at which the first upper frame 41 and the second upper frame 42 are inclined so as to be positioned closer to the vehicle-width-direction inner side toward the vehicle rear side, the lower frame rear-end joined portion 29 (lower joined portion) to which the rear end of the lower frame 43 is joined is positioned on the vehicle-width-direction inner side with respect to the first upper frame rear-end joined portion 27 (upper joined portion) and the second upper frame rear-end joined portion 28 (upper joined portion) in the rear side housing 10, and the rear side housing 10 is composed of a single member including at least the lower frame rear-end joined portion 29, the first upper frame rear-end joined portion 27, and the second upper frame rear-end joined portion 28 (see FIG. 1 to FIG. 7).

According to the abovementioned configuration, the load input from the rear suspension to the rear side housing 10 via the lower arm supporting portions 21a and 21b and the upper arm supporting portion 22 when the vehicle travels can be transmitted to the vehicle front side by the first upper frame 41, the second upper frame 42, and the lower frame 43 spaced apart from each other on the upper side and the lower side, and hence the support rigidity of the rear suspension can be secured.

According to the abovementioned configuration, the inclined angle at which the lower frame 43 is inclined to be positioned closer to the vehicle-width-direction inner side toward the vehicle rear side is set to be larger than the inclined angles at which the first upper frame rear-end joined portion 27 and the second upper frame rear-end joined portion 28 are inclined to be positioned closer to the vehicle-width-direction inner side toward the vehicle rear side, and the lower frame rear-end joined portion 29 is positioned on the vehicle-width-direction inner side with respect to the first upper frame rear-end joined portion 27 and the second upper frame rear-end joined portion 28 in the rear side housing 10.

In other words, the lower frame rear-end joined portion 29 and each of the first upper frame rear-end joined portion 27 and the second upper frame rear-end joined portion 28 can be joined to positions in the rear side housing 10 spaced apart from each other in the vehicle width direction.

In other words, by the lower frame 43, the first upper frame 41, and the second upper frame 42 and parts of the rear side housing 10 that connect rear ends thereof to each other, a truss shape T protruding toward the vehicle front side (the rear end of the coupled body 30) in plan view can be formed between the rear end of the coupled body 30 and the rear side housing 10 (see FIG. 5).

As a result, the rear-end collision load input to the rear side housing 10 from the vehicle rear side at the time of a rear-end collision can be transmitted to the coupled body 30, in other words, the vehicle front side by the lower frame 43 and the first and second upper frames 41 and 42 after securely receiving the rear-end collision load by the lower frame rear-end joined portion 29 (lower joined portion), and the first upper frame rear-end joined portion 27 and the second upper frame rear-end joined portion 28 (upper joined portion) spaced apart from each other in the width direction.

According to the abovementioned configuration, the rear side housing 10 is composed of a single member including at least the lower frame rear-end joined portion 29 (lower joined portion), and the first upper frame rear-end joined portion 27 and the second upper frame rear-end joined portion 28 (upper joined portion), and hence the transmission efficiency of the load can be increased between the lower frame rear-end joined portion 29 (lower joined portion), and the first upper frame rear-end joined portion 27 and the second upper frame rear-end joined portion 28 (upper joined portion) in the rear side housing 10. As a result, the rear-end collision load can be efficiently transmitted to the first upper frame 41, the second upper frame 42, and the lower frame 43 from the rear side housing 10.

Therefore, according to the abovementioned configuration, the support rigidity of the rear suspension can be secured by the first upper frame 41, the second upper frame 42, and the lower frame 43, and the rear-end collision load can be effectively transmitted to the coupled body 30 of the side sill 3 and the rear pillar 35.

As an aspect of the present disclosure, the rear side housing 10 includes the upper raised wall 12 including the first upper frame rear-end joined portion 27 and the second upper frame rear-end joined portion 28 (upper joined portion), the lower raised wall 13 included in a position spaced apart from the upper raised wall 12 on the vehicle-width-direction inner side with respect to the upper raised wall 12 and including the lower frame rear-end joined portion 29 (lower joined portion), and the step portion 14 that extends in the vehicle width direction so as to connect the upper raised wall 12 and the lower raised wall 13 to each other, and is composed of a single member including at least the upper raised wall 12, the lower raised wall 13, and the step portion 14 (see FIG. 1 to FIG. 7).

The lower frame 43, and the first upper frame 41 and the second upper frame 42 (upper frame) are spaced apart from each other in the vehicle up-down direction, and hence the lower frame rear-end joined portion 29 (lower joined portion), and the first upper frame rear-end joined portion 27 and the second upper frame rear-end joined portion 28 (upper joined portion) are not only spaced apart from each other in the vehicle width direction but also in the vehicle up-down direction.

According to the abovementioned configuration, also in the lower frame rear-end joined portion 29 and each of the first upper frame rear-end joined portion 27 and the second upper frame rear-end joined portion 28 spaced apart from each other in the vehicle up-down direction as described above, the rear side housing 10 has a form in which the upper raised wall 12 including the first upper frame rear-end joined portion 27 and the second upper frame rear-end joined portion 28, and the lower raised wall 13 including the lower frame rear-end joined portion 29 are connected to each other by the step portion 14 positioned therebetween in the vehicle up-down direction.

The rear side housing 10 is composed of a single member including the upper raised wall 12, the lower raised wall 13, and the step portion 14.

Therefore, the load transmission in the vehicle up-down direction via the step portion 14 between the lower frame rear-end joined portion 29, and each of the first upper frame rear-end joined portion 27 and the second upper frame rear-end joined portion 28 can also be efficiently performed.

Therefore, the rear-end collision load input to the rear side housing 10 from the vehicle rear side at the time of a rear-end collision can be transmitted to the coupled body 30, in other words, the vehicle front side after being appropriately distributed by the lower frame 43 and each of the first upper frame 41 and the second upper frame 42 of which heights are different in the vehicle up-down direction.

As an aspect of the present disclosure, the rear side frame 1 that extends in the vehicle front-rear direction such that the front portion overlaps with the rear side housing 10 when seen from a side of the vehicle and the rear portion is positioned on the vehicle rear side with respect to the rear side housing 10 is provided, and the rear end of the second upper frame 42 out of the first upper frame 41 and the second upper frame 42 (upper frame) and the front end of the rear side frame 1 are mainly joined to each other (see FIG. 2 to FIG. 5 and FIG. 7).

According to the abovementioned configuration, the rear-end collision load can be efficiently transmitted to the upper frame from the rear side frame 1.

As an aspect of the present disclosure, the front portion of the rear side frame 1 is disposed on the corner portion 24 between the step portion 14 and the upper raised wall 12 and is joined to the step portion 14 and the upper raised wall 12 (see FIG. 4, FIG. 5, and FIG. 7).

According to the abovementioned configuration, the front portion of the rear side frame 1 can be joined to the step portion 14 and the upper raised wall 12 in a state of being supported by the step portion 14 while a side face on the vehicle-width-direction inner side is placed along the upper raised wall 12.

Therefore, when the front portion of the rear side frame 1 is joined to the rear side housing 10, the joining can be firmly performed. As a result, the transmission efficiency of the rear-end collision load from the rear side frame 1 to the rear side housing 10 can be further increased.

As an aspect of the present disclosure, the coupling portions (20) (joined portion) between the rear ends of the first upper frame 41 and the second upper frame 42 (upper frame) and the front end of the rear side frame 1 are provided in positions at which the coupling portions (20) at least partially overlap with the upper arm supporting portion 22 when seen from a side of the vehicle (see FIG. 6 and FIG. 7).

According to the abovementioned configuration, the load input to the upper arm supporting portion 22 of the rear side housing 10 from the upper arm of the rear suspension when the vehicle travels can be efficiently transmitted to the side of the first upper frame 41 and the second upper frame 42 and the rear side frame 1 by being received by the coupling portions (20) provided in positions at which the coupling portions (20) at least partially overlap with the upper arm supporting portion 22 when seen from a side of the vehicle.

As an aspect of the present disclosure, each of the rear end of the first upper frame 41 and the rear end of the second upper frame 42, and the front end of the rear side frame 1 are joined to each other at the coupling portions (20) (joined portion) via the rear side housing 10, and the first rib 25 and the second ribs 26*a* and 26*b* (rib) that protrude from the side of the upper raised wall 12 of the rear side housing 10 (body) are integrally formed on the coupling portions (20) in the rear side housing 10 (see FIG. 3 to FIG. 5 and FIG. 7).

According to the abovementioned configuration, by the first rib 25 and the second ribs 26*a* and 26*b* formed on the coupling portions (20), the transmission efficiency of the rear-end collision load from the rear side frame 1 to the upper frame via the coupling portions (20) of the rear side housing 10 can be increased in addition to increasing the strength of the coupling portions (20).

Specifically, the rear-end collision load transmitted in the vehicle front-rear direction along the rear side frame 1 can be received from the rear end of the rear side frame 1 by the first rib 25 out of the plurality of ribs 25, 26*a*, and 26*b* that are provided. The rigidity of the first rib 25 against the rear-end collision load can be increased (the strength for receiving the rear-end collision load can be reinforced) by the second ribs 26*a* and 26*b*.

The transmission efficiency of the rear-end collision load in the coupling portions (20) from the rear side frame 1 to the first upper frame 41 and the second upper frame 42 via the rear side housing 10 can be increased by the plurality of ribs 25, 26*a,* and 26*b*.

As described above, the upper arm supporting portion 22 and the coupling portions (20) are provided in a position at which they at least partially overlap with each other when seen from a side of the vehicle via the body (upper raised wall 12) of the rear side housing 10.

Therefore, as described above, by providing the ribs 25, 26*a,* and 26*b* (in other words, the rib forming region 20) on the coupling portions (20), the support rigidity of the upper arm supporting portion 22 when the vehicle travels can also be increased as a result.

As an aspect of the present disclosure, the first upper frame 41 and the second upper frame 42 are joined to positions equivalent to the upper arm supporting portion 22, and the lower frame 43 is joined to a position equivalent to the lower arm front-side supporting portion 21*a* out of the lower arm supporting portions 21*a* and 21*b* (see FIG. 2 and FIG. 6).

According to the abovementioned configuration, by joining the first upper frame 41 and the second upper frame 42 to positions equivalent to the upper arm supporting portion 22, the load input from the upper arm of the rear suspension via the upper arm supporting portion 22 when the vehicle travels can be transmitted to the vehicle front side in a more efficient manner by the upper frames 41 and 42. Meanwhile, by joining the lower frame 43 to a position equivalent to the lower arm front-side supporting portion 21*a*, the load input from the lower arm via the lower arm front-side supporting portion 21a can be transmitted to the vehicle front side in a more efficient manner by the lower frame 43.

As an aspect of the present disclosure, the upper frame includes the first upper frame 41 and the second upper frame 42 positioned below the first upper frame 41 (FIG. 2 to FIG. 4, FIG. 6, and FIG. 7).

According to the abovementioned configuration, by separately forming the upper frame by the first upper frame 41 and the second upper frame 42, the plate thickness of the upper frame, the routing direction, the routing length, and the like are individually set in an easier manner in accordance with each of the joined sections as compared to a case where the first upper frame 41 and the second upper frame 42 are integrally formed.

Therefore, according to the abovementioned configuration, the support rigidity of the rear suspension can be secured and the rear-end collision load can be effectively transmitted to the coupled body 30 of the side sill 3 and the pillar while suppressing the increase of the vehicle body weight.

As an aspect of the present disclosure, the rear end of the second upper frame 42 is joined to the front end of the rear side frame 1 via the rear side housing 10 so as to overlap with the front end of the rear side frame 1 in the vehicle up-down direction more than the rear end of the first upper frame 41 (see FIG. 3, FIG. 4, and FIG. 7), and the second upper frame 42 is formed to have a thicker plate thickness than the first upper frame 41.

According to the abovementioned configuration, the rear-end collision load can be efficiently transmitted from the rear side frame 1 to the vehicle front side, in other words, the side of the side sill 3 via the second upper frame 42 of which plate thickness is thick.

As an aspect of the present disclosure, the side sill 3 has the upper closed cross-section portion 31 (side sill closed cross-section portion) formed therein, the upper closed cross-section portion 31 including the closed cross-sectional space that extends in the vehicle front-rear direction, the second upper frame 42 has the front end joined via the rear pillar 35 at the substantially same height as the rear end of the upper closed cross-section portion 31, and is formed in an inclined manner so as to be positioned closer to the vehicle lower side as the second upper frame 42 approaches the vehicle front side, and the upper closed cross-section portion 31 is formed in an inclined manner so as to be positioned closer to the upper side as the upper closed cross-section portion 31 approaches the vehicle rear side to correspond to the inclination angle of the second upper frame 42 when seen from a side of the vehicle (see FIG. 6 and FIG. 7).

According to the abovementioned configuration, the upper second frame extends in an inclined manner so as to be positioned closer to the lower side as the upper second frame approaches the vehicle front side in order to linearly connect the upper arm supporting portion 22 and the rear end portion of the upper closed cross-section portion 31 included on the vehicle front side and the vehicle lower side with respect to the upper arm supporting portion 22 to each other.

According to the abovementioned configuration, the upper closed cross-section portion 31 is formed in an inclined manner so as to be positioned closer to the upper side as the upper closed cross-section portion 31 approaches the vehicle rear side to correspond to the inclined shape of the upper second frame as above.

As a result, according to the abovementioned configuration, the upper second frame and the upper closed cross-section portion 31 can be connected to each other in a manner that is as linear as possible when seen from a side of the vehicle.

Therefore, according to the abovementioned configuration, the rear-end collision load can be efficiently transmitted to the vehicle front side, in other words, to the upper closed cross-section portion 31 from the joined portion between the front end of the upper second frame and the rear end of the upper closed cross-section portion 31 without causing the rear-end collision load to be concentrated on the joined portion.

As an aspect of the present disclosure, the lower edge 100d of the door opening 100 is formed in an inclined manner so as to be positioned closer to the upper side as the lower edge 100d approaches the vehicle rear side to correspond to the inclination angle of the upper closed cross-section portion 31 (see FIG. 1).

According to the abovementioned configuration, the vehicle front side can be positioned at a place lower than the vehicle rear side by forming the lower edge 100d of the door opening 100 in an inclined manner such that the lower edge 100d is positioned closer to the upper side as the lower edge 100d approaches the vehicle rear side along the upper closed cross-section portion 31. As a result, the occupant can easily perform the boarding and the alighting by smoothly striding over the lower edge 100d of the door opening 100 when the occupant boards on and alights from the vehicle cabin while an inadvertent increase in size of the door opening 100 can be suppressed.

As an aspect of the present disclosure, all of the rear ends of the first upper frame 41, the second upper frame 42, and the lower frame 43 are integrally joined to the rear side housing 10 as vehicle body parts (see FIG. 2 to FIG. 4, FIG. 6, and FIG. 7).

According to the abovementioned configuration, all of the rear ends of the first upper frame 41, the second upper frame 42, and the lower frame 43 are integrally joined to the rear side housing 10 by welding and the like as vehicle body parts when the vehicle body is assembled and are not mounted later by fastening and the like using fasteners after the assembling of the vehicle body is finished.

Therefore, the unity between the rear ends of the first upper frame 41, the second upper frame 42, and the lower frame 43, and the rear side housing 10 can be increased. As a result, the load transmission efficiency from the rear side housing 10 to the vehicle front side via the first upper frame 41, the second upper frame 42, and the lower frame 43 can be increased.

As an aspect of the present disclosure, the rear side housing 10 is composed of a single member in an integral manner, the single member including at least the lower arm supporting portions 21a and 21b, the upper arm supporting portion 22, the lower frame rear-end joined portion 29 (lower joined portion), and the first upper frame rear-end joined portion 27 and the second upper frame rear-end joined portion 28 (upper joined portion) (see FIG. 2, FIG. 6, and FIG. 7).

According to the abovementioned configuration, the rigidity of the rear side housing 10 can be increased as compared to a case where the rear side housing 10 is formed by combining a plurality of members, and hence the support rigidity of the rear suspension and the transmission efficiency of the rear-end collision load to the vehicle front side can be further increased.

The influence of dimensional errors included in each member is not accumulated as in the case where a plurality of members are combined, and hence the accuracy of the positions of the lower arm supporting portions 21a and 21b and the upper arm supporting portion 22 in the rear side housing 10 can be increased, for example.

The present disclosure is not limited to the configurations of the abovementioned embodiment and can be implemented by various embodiments. For example, the upper frame of the present disclosure is not limited to a shape that is inclined so as to be positioned closer to the vehicle-width-direction inner side toward the vehicle rear side as with the first upper frame 41 and the second upper frame 42 of this embodiment, and may have a shape that extends to be parallel to the vehicle front-rear direction or a shape that is inclined so as to be positioned closer to the vehicle outer side toward the vehicle rear side, for example.

The present disclosure is not limited to a case where the first upper frame 41 is formed in an inclined manner so as to be positioned closer to the vehicle-width-direction inner side toward the vehicle rear side as compared to the second upper frame 42 and the lower frame 43 as in this embodiment, and the second upper frame 42 may be formed in an inclined manner so as to be positioned closer to the vehicle-width-direction inner side toward the vehicle rear side as compared to the lower frame 43 and the first upper frame 41.

In the abovementioned embodiment, the upper frame is formed to be separated into the first upper frame 41 and the second upper frame 42 positioned below the first upper frame 41, but the upper frame of the present disclosure is not limited to the configuration using two frames as described above and may employ a configuration separated into three or more frames.

Figure 8:
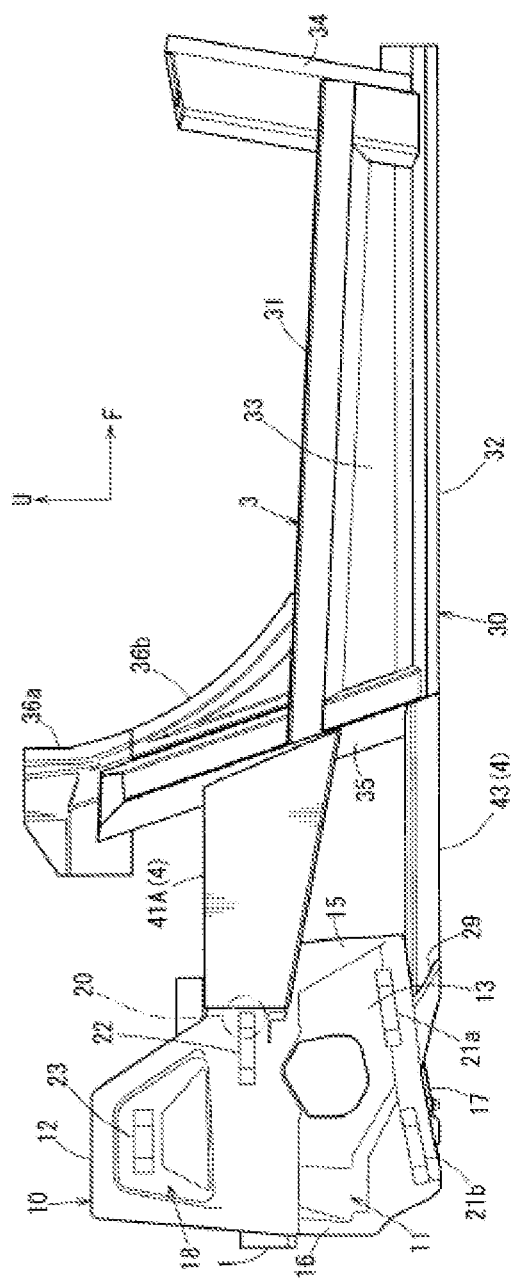
FIG. 8 is a right side view of a rear vehicle-body structure of a vehicle according to a modification of this embodiment illustrated so as to correspond to FIG. 6.

As illustrated in FIG. 8, for example, in the upper frame of the present disclosure, the first upper frame 41 and the second upper frame 42 may be integrally formed as one frame member 41A.

What is claimed is:

1. A rear vehicle-body structure of a vehicle, the rear vehicle-body structure comprising:
   a rear side housing including a lower arm supporting portion that supports a lower arm of a rear suspension and an upper arm supporting portion that supports an upper arm of the rear suspension;
   a side sill that extends in a vehicle front-rear direction on a vehicle front side with respect to the rear side housing;
   a pillar that extends in a vehicle up-down direction and has a lower portion joined to the side sill; and
   at least an upper frame and a lower frame that are spaced apart from each other in the vehicle up-down direction and connect a rear end of a coupled body composed of the side sill and the pillar, and the rear side housing, to each other, an inclined angle at which the lower frame is inclined so as to be positioned closer to a vehicle inner side toward a vehicle rear side being larger than an inclined angle at which the upper frame is inclined so as to be positioned closer to the vehicle inner side toward the vehicle rear side; and
   a lower joined portion to which a rear end of the lower frame is joined, the lower joined portion being positioned on a vehicle-width-direction inner side with respect to an upper joined portion to which a rear end of the upper frame is joined in the rear side housing,
   wherein the rear side housing is composed of a single member including at least the lower joined portion and the upper joined portion.

2. The rear vehicle-body structure of the vehicle according to claim 1, wherein
   the rear side housing is composed of a single member including at least an upper raised wall including the upper joined portion,
   a lower raised wall included in a position spaced apart from the upper raised wall on the vehicle-width-direction inner side with respect to the upper raised wall and including the lower joined portion, and
   a step portion that extends in a vehicle width direction so as to connect the upper raised wall and the lower raised wall to each other.

3. The rear vehicle-body structure of the vehicle according to claim 2, further comprising:
   a rear side frame that extends in the vehicle front-rear direction such that a front portion overlaps with the rear side housing when seen from a side of the vehicle and a rear portion, the rear side frame being positioned on the vehicle rear side with respect to the rear side housing is provided, and
   wherein the rear end of the upper frame and the front end of the rear side frame are joined to each other.

4. The rear vehicle-body structure of the vehicle according to claim 3, wherein
   the front portion of the rear side frame is disposed on a corner portion between the step portion and the upper raised wall and is joined to the step portion and the upper raised wall.

5. The rear vehicle-body structure of the vehicle according to claim 4, further comprising:
   a joined portion between the rear end of the upper frame and the front end of the rear side frame in a position at which the joined portion at least partially overlaps with the upper arm supporting portion when seen from the side of the vehicle.

6. The rear vehicle-body structure of the vehicle according to claim 5, wherein
   the rear end of the upper frame and the front end of the rear side frame are joined to each other at the joined portion via the rear side housing; and
   a rib that protrudes from a body side of the rear side housing is integrally formed on the joined portion in the rear side housing.

7. The rear vehicle-body structure of the vehicle according to claim 6, wherein
   the upper frame is joined to a position equivalent to the upper arm supporting portion, and the lower frame is joined to a position equivalent to the lower arm supporting portion.

8. The rear vehicle-body structure of the vehicle according to claim 7, wherein
   the upper frame includes a first upper frame and a second upper frame positioned below the first upper frame.

9. The rear vehicle-body structure of the vehicle according to claim 8, further comprising:
   a rear side frame that extends in the vehicle front-rear direction such that a front portion overlaps with the rear side housing when seen from a side of the vehicle and a rear portion is positioned on the vehicle rear side with respect to the rear side housing;
   wherein
   a rear end of the second upper frame and a front end of the rear side frame are joined to each other, and
   the second upper frame has a thicker plate thickness than the first upper frame.

10. The rear vehicle-body structure of the vehicle according to claim 9, wherein
    the side sill has a side sill closed cross-section portion formed therein, the side sill closed cross-section portion including a closed cross-sectional space that extends in the vehicle front-rear direction;

the upper frame has a front end joined to a section in the coupled body corresponding to a rear end of the side sill closed cross-section portion, and is configured in an inclined manner so as to be positioned closer to a vehicle lower side as the upper frame approaches the vehicle front side; and the side sill closed cross-section portion is configured in an inclined manner so as to be positioned closer to an upper side as the side sill closed cross-section portion approaches the vehicle rear side to correspond to an inclination angle of the upper frame when seen from a side of the vehicle.

11. The rear vehicle-body structure of the vehicle according to claim 10, wherein a lower edge portion of a door opening is configured in an inclined manner so as to be positioned closer to the upper side as the lower edge portion approaches the vehicle rear side to correspond to an inclination angle of the side sill closed cross-section portion when seen from a side of the vehicle.

12. The rear vehicle-body structure of the vehicle according to claim 11, wherein both of the rear ends of the upper frame and the lower frame are integrally joined to the rear side housing as vehicle body parts.

13. The rear vehicle-body structure of the vehicle according to claim 12, wherein the rear side housing is composed of a single member in an integral manner, the single member including at least the lower arm supporting portion, the upper arm supporting portion, the upper joined portion, and the lower joined portion.

14. The rear vehicle-body structure of the vehicle according to claim 1, wherein the upper frame is joined to a position equivalent to the upper arm supporting portion, and the lower frame is joined to a position equivalent to the lower arm supporting portion.

15. The rear vehicle-body structure of the vehicle according to claim 1, wherein the upper frame includes a first upper frame and a second upper frame positioned below the first upper frame.

16. The rear vehicle-body structure of the vehicle according to claim 1, wherein the side sill has a side sill closed cross-section portion formed therein, the side sill closed cross-section portion including a closed cross-sectional space that extends in the vehicle front-rear direction;

the upper frame has a front end joined to a section in the coupled body corresponding to a rear end of the side sill closed cross-section portion, and is configured in an inclined manner so as to be positioned closer to a vehicle lower side as the upper frame approaches the vehicle front side; and the side sill closed cross-section portion is configured in an inclined manner so as to be positioned closer to an upper side as the side sill closed cross-section portion approaches the vehicle rear side to correspond to an inclination angle of the upper frame when seen from a side of the vehicle.

17. The rear vehicle-body structure of the vehicle according to claim 1, wherein both of the rear ends of the upper frame and the lower frame are integrally joined to the rear side housing as vehicle body parts.

18. The rear vehicle-body structure of the vehicle according to claim 1, wherein the rear side housing is composed of a single member in an integral manner, the single member including at least the lower arm supporting portion, the upper arm supporting portion, the upper joined portion, and the lower joined portion.

19. The rear vehicle-body structure of the vehicle according to claim 15, further comprising:

a rear side frame that extends in the vehicle front-rear direction such that a front portion overlaps with the rear side housing when seen from a side of the vehicle and a rear portion is positioned on the vehicle rear side with respect to the rear side housing;

wherein a rear end of the second upper frame and a front end of the rear side frame are joined to each other, and the second upper frame has a thicker plate thickness than the first upper frame.

20. The rear vehicle-body structure of the vehicle according to claim 16, wherein a lower edge portion of a door opening is configured in an inclined manner so as to be positioned closer to the upper side as the lower edge portion approaches the vehicle rear side to correspond to an inclination angle of the side sill closed cross-section portion when seen from a side of the vehicle.

* * * * *